United States Patent
Spick et al.

(10) Patent No.: US 11,465,585 B2
(45) Date of Patent: Oct. 11, 2022

(54) ACTIVATION MODULE SIMULTANEOUSLY DETECTING THE APPROACH AND PRESSURE OF A USER WITH A MOVABLE HIGH-FREQUENCY ANTENNA

(71) Applicant: VITESCO TECHNOLOGIES GMBH, Hanover (DE)

(72) Inventors: Gabriel Spick, Toulouse (FR); Olivier Elie, Toulouse (FR); Olivier Gerardiere, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 17/258,942

(22) PCT Filed: Jul. 10, 2019

(86) PCT No.: PCT/EP2019/068499
§ 371 (c)(1),
(2) Date: Jan. 8, 2021

(87) PCT Pub. No.: WO2020/011834
PCT Pub. Date: Jan. 16, 2020

(65) Prior Publication Data
US 2021/0122334 A1 Apr. 29, 2021

(30) Foreign Application Priority Data
Jul. 12, 2018 (FR) .................................. 1856428

(51) Int. Cl.
*B60R 25/24* (2013.01)
*H04B 5/00* (2006.01)
(Continued)

(52) U.S. Cl.
CPC ............ *B60R 25/245* (2013.01); *B60R 25/01* (2013.01); *G01V 3/08* (2013.01); *G06K 7/10297* (2013.01);
(Continued)

(58) Field of Classification Search
CPC ....... B60R 25/245; B60R 25/01; B60R 25/25; G07C 9/00309; G07C 2209/65;
(Continued)

(56) References Cited

U.S. PATENT DOCUMENTS 3,196,440 A * 7/1965 Weinstein .......... G07C 9/00309
70/277
8,929,814 B2 1/2015 Cheikh
(Continued)

FOREIGN PATENT DOCUMENTS

CN 103346819 A 10/2013
CN 107710285 A 2/2018
(Continued)

OTHER PUBLICATIONS

Office Action issued in Chinese Patent Application No. 201980058690.7 dated Aug. 31, 2021.
(Continued)

*Primary Examiner* — Edwin C Holloway, III
(74) *Attorney, Agent, or Firm* — Nixon & Vanderhye

(57) ABSTRACT

Disclosed is an activation module for a function in a motor vehicle accommodated in a component, the module including a detection and communication device including at least one communication antenna transmitting at a high frequency and a device for detecting a deformation of the component, the communication antenna being connected to a printed circuit board including a unit for measuring voltage variation across the terminals of the communication antenna, a unit for interpreting the measuring unit and transmission and
(Continued)

reception unit with an electronic control unit having a unit for activating the function. The communication antenna is movable relative to the printed circuit board under the action of the deformation of the component, the measuring unit then detecting a voltage variation across the terminals of the communication antenna.

18 Claims, 1 Drawing Sheet

(51) Int. Cl.
*H01Q 1/32* (2006.01)
*H04B 5/02* (2006.01)
*G06K 7/10* (2006.01)
*G01V 3/08* (2006.01)
*B60R 25/01* (2013.01)
*B60R 25/25* (2013.01)

(52) U.S. Cl.
CPC ....... *G06K 7/10336* (2013.01); *H01Q 1/3241* (2013.01); *H04B 5/0043* (2013.01); *H04B 5/02* (2013.01); *B60R 25/25* (2013.01)

(58) Field of Classification Search
CPC ........... G06K 7/10297; G06K 7/10336; H01Q 1/3241; H04B 5/0043; H04B 5/02; H04B 5/0025; G01V 3/08; E05B 81/77
USPC .............................................. 340/5.61, 5.72
See application file for complete search history.

(56) References Cited

U.S. PATENT DOCUMENTS

| | | | |
|---|---|---|---|
| 10,290,165 B2 | 5/2019 | Farges et al. | |
| 10,428,562 B2 | 10/2019 | Guibbert et al. | |
| 10,975,601 B2 | 4/2021 | Beck et al. | |
| 2005/0083174 A1* | 4/2005 | Nakamura | E05B 81/78 340/5.72 |
| 2007/0008235 A1* | 1/2007 | Tsukahara | E05B 81/78 343/788 |
| 2007/0075828 A1* | 4/2007 | Mizushima | E05B 81/78 340/5.72 |
| 2008/0100522 A1* | 5/2008 | Inaba | E05B 81/78 343/866 |
| 2013/0244577 A1* | 9/2013 | Cheikh | H01Q 7/00 455/41.1 |
| 2016/0230429 A1* | 8/2016 | Witte | E05B 85/16 |
| 2017/0016255 A1* | 1/2017 | Guibbert | B60R 25/01 |
| 2017/0260778 A1* | 9/2017 | Witte | G07C 9/00174 |
| 2018/0230717 A1 | 8/2018 | Beck et al. | |
| 2019/0017302 A1 | 1/2019 | Beck et al. | |
| 2019/0017303 A1 | 1/2019 | Beck et al. | |
| 2019/0169893 A1* | 6/2019 | Scheiern | G01R 27/2605 |

FOREIGN PATENT DOCUMENTS

| | | |
|---|---|---|
| CN | 107835883 A | 3/2018 |
| DE | 10 2015 111311 | 1/2017 |
| EP | 1 349 236 | 10/2003 |
| FR | 3013069 | 5/2015 |
| FR | 3 038 642 | 1/2017 |

OTHER PUBLICATIONS

International Search Report and Written Opinion of the ISA for PCT/EP2019/068499, dated Aug. 19, 2019, 9 pages.

* cited by examiner

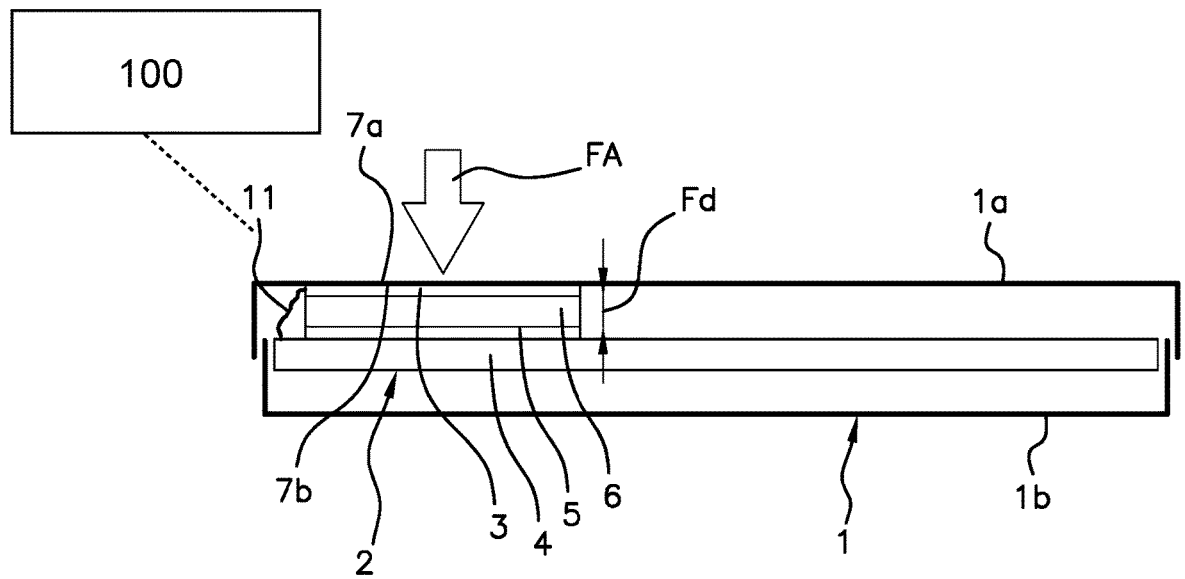
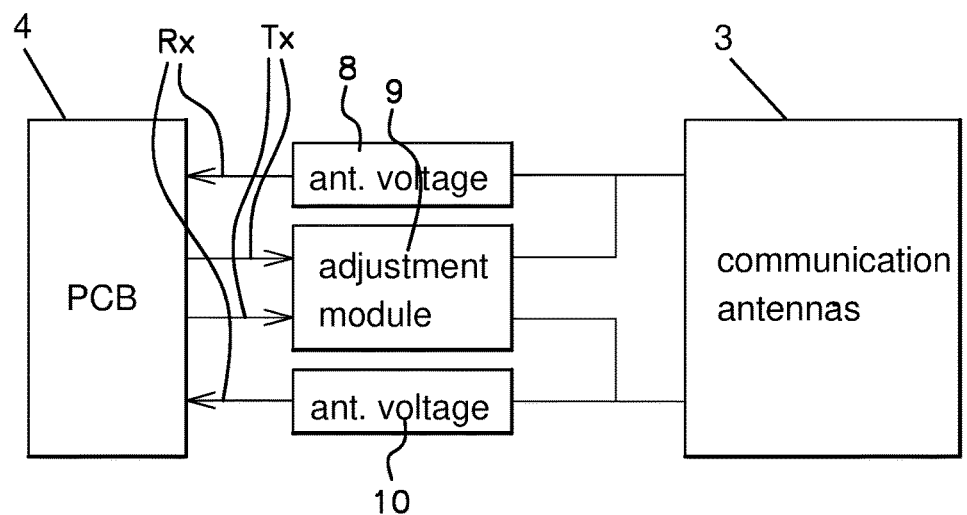
Fig 2

ACTIVATION MODULE SIMULTANEOUSLY DETECTING THE APPROACH AND PRESSURE OF A USER WITH A MOVABLE HIGH-FREQUENCY ANTENNA

BACKGROUND OF THE INVENTION

This application is the U.S. national phase of International Application No. PCT/EP2019/068499 filed 10 Jul. 2019, which designated the U.S. and claims priority to FR Patent Application No. 1856428 filed 12 Jul. 2018, the entire contents of each of which are hereby incorporated by reference.

Field of the Invention

The present invention is concerned with an activation module detecting an approach toward and a deformation of a component, which is present in a motor vehicle and accommodates the activation module, when a user presses the component, the module having a detection and communication device with a movable high-frequency communication antenna serving to perform these two successive detections.

The present invention is also concerned with a method for activating a function of a motor vehicle from a portable access device with which a user is equipped communicating with a detection and communication device accommodated in a component of the vehicle. In this method, the activation results firstly from a detection of the approach of the access device toward the vehicle. Secondly, the activation results from a detection of a deformation of the component after a part of the user's body presses the component, leading to an, even limited, deformation of the component similar to a reversible micro-deformation.

Description of the Related Art

In the first approach detection step, according to the prior art, there is a periodic transmission of signals at a high frequency selected between 3 and 30 MHz that are sent by at least one communication antenna of the detection and communication device.

These signals are intercepted by the portable access device in the possession of the user heading toward the motor vehicle and are similar to short presence-signalling signals.

According to the prior art, the access device is generally an electronic badge that transmits a signal back. The signal received back by the antenna of the detection device, comprising the identifier of the access device, is transmitted via radio-frequency or low-frequency waves.

Nowadays, however, it is increasingly common to use a cell phone to perform authentication functions, which makes it possible to avoid using a dedicated electronic badge and thus to limit the number of devices. Most mobile phones do not have RF or LF communication means; it is known practice to use a high-frequency wave communication module, in particular for near field communication, referred to as NFC for "Near Field Communication". This module is fitted to most existing telephones in order to send an identifier in the case of a vehicle unlocking function.

The approach of the access device close to the detection and communication device, for example to within 10 centimeters of the detection and communication device, and recognition of the identifier received by a computer of an electronic control unit on board the motor vehicle allow the activation of a function with which the motor vehicle is equipped, for example the locking or unlocking of a door of the motor vehicle, provided that a second part of the detection is complete.

The approach is detected, in response to the signals sent by said at least one detection antenna of the detection and communication device on board the motor vehicle, by a first variation in a voltage across the terminals of said at least one communication antenna. This approach detection can be confirmed by a subsequent establishment of a communication between the detection device and the access device.

In the second part of the detection, in order to activate a function, a deformation of the component due to a part of the user's body pressing it is detected, this detection frequently being carried out, according to the prior art, by a capacitive sensor or an inductive sensor.

An inductive sensor is more reliable than a capacitive sensor but used less than the latter. The inductive sensor is mainly used when the activation of the sensor drives a mechanical actuator, for example in order to open or close a door or to deploy a handle.

This inductive sensor detects a deformation by comprising a metal target that moves toward a coil of the sensor when the user presses the locking or unlocking area. The variation in inductance of the coil of the inductive sensor, due to the target approaching the coil, allows the detection of the user's locking or unlocking intention to be validated.

However, incorporating a high-frequency communication device, in particular a near-field communication device, and an inductive pressing detection sensor into the same motor vehicle component, in particular the same vehicle door handle, has several drawbacks. The first drawback lies in the positioning of the two devices: the coil of the inductive sensor and the coil acting as the communication antenna of the communication device must not be located opposite each other because they interfere with one another.

Specifically, any metal part located close to the high-frequency communication antenna, for example the target or the coil of the inductive sensor, absorbs a portion of the electromagnetic field transmitted by said antenna and affects detection and communication with the portable device. Stacking the two devices in a component such as a handle is therefore not conceivable, and they must therefore be located side by side. However, since the space in components such as handles is increasingly restricted, principally out of concern for the esthetics of the handle, mechanically incorporating the components side by side is not always possible due to a lack of space.

In general, a detection device using high-frequency communication and an inductive sensor can be systems that operate as an alternative for configurations for activating a function.

One option is that the user does not have a key in the form of an electronic badge but only uses his cell phone, then unlocks the vehicle by bringing his telephone to the handle of the door of the motor vehicle. In this case, the approach detection and the authentication are performed on the telephone and can therefore be performed only by the detection device using high-frequency communication. Indeed, a communication established with the detection device and the telephone ensures that the user is close to the door and wishes to open it.

Alternatively, the user wears a badge. Authentication is then performed by a detection device, for example a high-frequency detection device or more commonly a low-frequency antenna system and the pressing of an inductive sensor, which results in the door of the motor vehicle opening automatically. In the case of opening, this allows the door not to be opened just when the user approaches, as this approach is not sufficient in itself to consider with certainty that the user wishes to open.

If a high-frequency approach detection device is associated with an inductive sensor in order to unlock or lock a motor vehicle door, there could thus be several possible configurations. In a first configuration, the (un)locking can be performed by combining a detection by the detection device and an opening of the door following an establishment of a communication between the device and the portable access device of the user.

In a second configuration, the (un)locking and opening or closing of the door can be performed by the detection device if no badge is used or by detection involving an (un)locking associated with an opening of the door by using an inductive sensor if the user has the badge.

The pressing of an inductive sensor therefore does not necessarily follow the approach of a telephone, since a communication is able to be established between the telephone and the detection device and is able to be sufficient for an unlocking of the door, given that in this case the telephone and therefore its user are very close to the door and the user therefore wishes to open the door.

SUMMARY OF THE INVENTION

The problem on which the present invention is based is, for a module accommodated in a component of a motor vehicle for activating a function that is present in the vehicle, this activation being performed in association with a portable access device with which a user is equipped, to perform this activation with a detection and communication device combining the two functions of approach detection and detection of deformation of the component when the user presses the component.

To this end, the present invention is concerned with an activation module for a function, which activation module is intended to be incorporated into a component that is present in a motor vehicle in order to activate a function of the vehicle from a portable access device with which a user is equipped, the activation module comprising, on the one hand, a detection and communication device comprising at least one communication antenna transmitting a magnetic field at a high frequency selected between 3 and 30 MHz for a detection of the portable access device and a communication with the access device and, on the other hand, a device for detecting a deformation of the component after a part of the user's body presses the component, said at least one communication antenna being connected by an electrical connection to a printed circuit board comprising means for measuring voltage variation across the terminals of said at least one communication antenna, means for interpreting the measuring means and transmission and reception means with an electronic control unit having means for activating the function, notable in that said at least one communication antenna is movable relative to the printed circuit board under the action of a pressure on said at least one communication antenna, the measuring means then detecting a voltage variation across the terminals of said at least one communication antenna.

The pressure on said at least one communication antenna is calculated to correspond to the deformation of the component being pressed by a user.

The technical effect achieved by implementing the activation module according to the invention is to perform the detection of the deformation of the component by means of the device that has been used for detecting the approach of the user and the access device that the user carries. A deformation detection device such as an inductive sensor, which took up space in a component delimiting a necessarily reduced interior space, is therefore eliminated. The target and the coil of the inductive sensor are therefore replaced by an element associated with the printed circuit board for the target and the communication antenna for the coil. The communication antenna can perform two functions within the context of the invention, an approach detection function and a function for detecting deformation of the component incorporating it.

A simplification of the activation module combining both the approach detection device and the device for detecting deformation of the component is therefore obtained.

The antenna periodically transmits pulses that contain no information. Each pulse will create a voltage change across the terminals of the antenna according to the impedance of this antenna. If the environment of the antenna is changed, for example by the approach of a metallic element close to the antenna, in particular a cell phone, then the impedance of the antenna will be changed. Thus, the voltage across the terminals of the antenna during a pulse will be changed. It is then possible to detect a change in the environment of the antenna by monitoring the voltage across its terminals.

Indeed, the approach of an access device changes the parameters of the communication antenna, which changes the voltage across the terminals of the antenna. Such a method of sending pulsed signals makes it possible to detect the approach of a compatible device with low consumption.

The invention involves using this method of sending pulsed signals to detect not only the approach of a compatible access device such as an electronic badge or a cell phone provided with the appropriate application but also to detect a deformation of the component by the act of the user pressing it following his approach.

The movement of the antenna, advantageously by moving closer, relative to the printed circuit board then causes a variation in the transmitted signal with a variation in the voltage across the terminals of the antenna when a signal is transmitted in comparison with a signal transmitted previously without movement of the antenna. It is then possible to detect a movement of the antenna caused by a deformation of the component incorporating it. Such a deformation detection is then possible without the need to use an inductive or capacitive sensor, which is a simplification of the activation module.

It should be borne in mind that the activation module of the present invention may be just as suitable for an approach detection followed by a confirmation of detection by communication between a portable access device and the activation module, therefore for a detection and communication device single-handedly providing the unlocking or locking of the door, as for a detection device associated with an inductive detection.

It follows that the activation module can be used for various scenarios that arise, for example either with a telephone as portable access device in the possession of the user, in which case an inductive presence check is not necessary, or else with a badge in the possession of the user, in which case, as there is no communication between the badge and the detection device after detection, an inductive check on the act of the user pressing the handle of the door is required.

Even in the case of an activation module providing the activation from only a detection and high-frequency communication device, an activation module according to the present invention with a movable communication antenna can have the advantage of being able to perform the activation even if the communication has proved to be deficient and has not taken place following the approach detection for the activation, in which case it is the deformation by the act of the user pressing the handle that is detected by the activation module with a movable communication antenna and that allows the activation. This therefore allows the activation of a function even when the detection and communication device has not fully fulfilled its role with regard to communication after approach detection.

Advantageously, said at least one communication antenna is movable toward the printed circuit board, a ferrite layer being sandwiched between said at least one communication antenna and the printed circuit board.

The ferrite layer deflects the magnetic field lines, which decreases magnetic losses in metallic elements in proximity to the ferrite, such as a ground plane of the printed circuit board. The ferrite layer increases the inductance of said at least one antenna by causing a stronger variation in the second voltage variation across the terminals of said at least one communication antenna, advantageously by increasing it, when the component is deformed when pressed by the user.

Advantageously, a foam layer is interposed between the ferrite layer and said at least one communication antenna and said at least one communication antenna is carried by a flexible printed circuit board. The foam layer supports said at least one communication antenna. In addition, as a material such as polyurethane fills the interior of the component incorporating the activation module, the interposition of a foam layer between said at least one communication antenna and the ferrite layer prevents the introduction of polyurethane between said at least one communication antenna and the ferrite layer.

At least one communication antenna, the ferrite layer and the printed circuit board extend in parallel planes. At least this communication antenna, the foam layer, the ferrite layer and the printed circuit board are adjacent by successively resting on each other. The elements of the activation module are supported successively, which prevents parasitic movements between these elements other than the movement of said at least one communication antenna during the deformation movement of the component.

It is possible to use a relatively flexible intermediate printed circuit board on which said at least one communication antenna is located, this intermediate printed circuit board being different from the printed circuit board mentioned previously.

The flexible intermediate printed circuit board carrying said at least one communication antenna can be glued against an area of the inner wall of the component, advantageously to a cover of the component when present and accessible from the outside by the user. When the user presses an outer wall area of the component facing the inner wall area to which the intermediate printed circuit board is glued, the wall is deformed and said at least one communication antenna moves closer to the printed circuit board.

The invention is also concerned with a component carried by a motor vehicle, notable in that it incorporates an activation module of this kind into a closed interior space, an outer wall area of the component being capable of being pressed by a part of the user's body, said at least one communication antenna of the module being in contact with an inner wall area of the component facing the outer wall area.

Advantageously, the component is a motor vehicle door handle or door frame.

The present invention is also concerned with a method for activating a function of a motor vehicle from a portable access device with which a user is equipped communicating with a detection and communication device in an activation module of this kind accommodated in a component of the vehicle, an activation resulting, on the one hand, from a detection of the approach of the access device toward the vehicle by periodic transmission of signals at a high frequency selected between 3 and 30 MHz that are sent by at least one communication antenna of the detection and communication device, the approach being detected, in response to said signals, by a first variation in a voltage across the terminals of said at least one communication antenna and being confirmed by a subsequent establishment of a communication between the detection device and the access device and, on the other hand, from a detection of a deformation of the component after a part of the user's body presses the component, notable in that the act of a part of the user's body pressing the component moves said at least one communication antenna in the component, creating a second voltage variation across the terminals of said at least one communication antenna, and when this second voltage variation is detected subsequently to a confirmed first variation the function is activated.

It should be borne in mind that the method described previously is not the only one that an activation module according to the present invention can implement. The activation module according to the present invention can implement an activation method involving only the detection and communication device without having recourse to an inductive measurement, or can be used to confirm an approach detection even when a communication has not been established for some reason between the detection and communication device, on the one hand, and the portable access device, on the other hand. This relates more particularly to a portable access device in the form of a telephone or similar equipment.

The same activation module can implement a method of approach detection by a high-frequency device and detection of the user pressing the handle without requiring the presence of an inductive sensor replaced by the communication antenna as a coil and an element of the activation module as a target, preferably a ferrite layer. This is particularly relevant when the portable access device is a simple badge without the possibility of communication similar to that established with a cell phone.

Thus, the same activation module according to the present invention may be suitable for multiple different activation methods using portable access devices capable of providing communication or using badges that do not provide communication with the detection and communication device after detection.

Advantageously, the first variation is a drop in the voltage across the terminals of said at least one communication antenna and the second variation is an increase in the voltage across the terminals of said at least one communication antenna. The second variation will be positive only if the antenna moves closer not to a metallic element but rather to a ferrite. For this, as mentioned previously, it is advantageous to glue a ferrite layer to the printed circuit board.

It is appropriate to differentiate between the first and the second variations even though a first variation corresponding to an approach detection can be confirmed by establishing a communication between the approach detection device providing the communication with the portable access device. This can be done by adjusting the parameters of the communication antenna or antennas or by adding a ferrite layer to the device.

Thus, it is possible, from the pulsed signals, to determine whether a portable access device compatible with the detection or high-frequency communication device is approaching, resulting in a decrease in the signal and the voltage across the terminals of said at least one communication antenna, or if there has been a deformation of the component due to the act of the user pressing with an increase in the signal and the voltage across the terminals of said at least one communication antenna.

Advantageously, the communication takes place at a frequency of 13.56 MHz.

Advantageously, the communication takes place in the near field. Near field is a secure communication method requiring close positioning of the portable access device with respect to the detection and near field communication device accommodated in the component of the motor vehicle.

BRIEF DESCRIPTION OF THE DRAWINGS

Other features, aims and advantages of the present invention will become apparent from reading the detailed description that follows and from examining the appended drawings given by way of non-limiting examples, in which:

FIG. 1 is a schematic representation of a sectional view of a motor vehicle door handle as an embodiment of a component that is present in the vehicle comprising an embodiment of the activation module according to the present invention, FIG. 2 is a schematic representation of a flowchart of the detection method according to the present invention showing the control by a microprocessor integrated in the printed circuit board of the activation module for a communication antenna of a detection and communication device forming part of the module and specifically designed for detecting an approach of the user of the motor vehicle but also fulfilling, in accordance with the present invention, the role of a device for detecting a deformation of the component that is representative of the act of the user pressing the component.

DESCRIPTION OF THE PREFERRED EMBODIMENTS

Referring to FIGS. 1 and 2, the present invention relates to a method for activating a function of a motor vehicle from a portable access device 100 with which a user is equipped communicating with an activation module 2 accommodated in a component 1 of the vehicle. An activation results, on the one hand, from a detection of an approach of the access device toward the vehicle by a detection and communication device. The portable access device 100 can be an electronic badge or a cell phone.

The detection and communication device has at least one communication antenna 3 periodically transmitting signals at a high frequency selected between 3 and 30 MHz. This detection and communication device can be a detection and near field communication device as mentioned previously. Without limitation, the preferred operating frequency can be 13.56 MHz.

The signals can be pulses transmitted by the detection and communication device without containing information.

The activation module 2 can contain multiple communication antennas 3 so as, for example, to have a detection operating configuration and a communication operating configuration. For example, one communication antenna 3 can be active while another communication antenna 3 is not or is set to resonance, which makes it possible to modulate the electromagnetic field transmitted by the activation module 2.

The approach is detected, in the detection and communication device present in the component 1 and in response to said signals, by a first variation in a voltage across the terminals of said at least one communication antenna 3. The first voltage variation can be detected during a rereading of the voltage of the antenna referenced 8 in FIG. 2, the voltages across the terminals of the communication antenna 3 being transmitted to a microprocessor integrated in a printed circuit board 4 forming part of the activation module 2, the transmission received by the microprocessor being referenced Rx in FIG. 2.

For an activation of the function, this approach detection is confirmed by a subsequent establishment of a communication between the detection device and the access device. Indeed, if the portable access device is detected while being compatible with the detection and communication device, a communication can be established between the detection and communication device and the portable access device. This makes it possible to avoid false detection of a stray object being inadvertently taken as a portable access device of the user.

Another confirmation of detection consists in a part of the user's body pressing the component 1 accommodating the activation module 2. The part of the body is advantageously the hand, more precisely a finger of the user, but may also be a foot or another part of the body. This pressing of an outer wall area 7a of the component 1 causes a micro-deformation of the component 1, which can then be detected.

According to the present invention, the act of a part of the user's body pressing the component 1 moves said at least one communication antenna 3 in the component 1, creating a second voltage variation across the terminals of said at least one communication antenna 3. This voltage variation is transmitted and received Tx to/at the microprocessor of the printed circuit board 4 during a rereading of the antenna voltage referenced 10 in FIG. 2. When this second voltage variation is detected subsequently to a confirmed first variation the function is activated.

The microcontroller of the printed circuit board 4 can adjust the transmission and reception parameters of said at least one communication antenna 3 so that the first and second voltage variations across the terminals of said at least one communication antenna 3 are indeed distinct from each other, which is done by virtue of the microcontroller transmitting control signals TX to an adjustment module 9 for adjusting the parameters of the communication antenna 3 that is able to control the parameters of said at least one communication antenna 3.

The communication antenna 3 moves in the activation module 2 by moving closer to an element of the activation module acting as an inductive sensor target, such as for example a ferrite or electromagnetic material layer or another element associated with the printed circuit board 4. It is possible to perform an adjustment of the parameters of the antenna by means of the adjustment module 9, which is different when the communication antenna 3 operates by communicating with the portable access device than when the communication antenna 3 operates as a target for detecting the deformation of the component 1 incorporating the activation module 2.

For example, it is possible to make an adjustment by means of the specific adjustment module 9 for an approach detection and a deformation detection so that the first variation is a drop in the voltage across the terminals of said at least one communication antenna 3 and the second variation is an increase in the voltage across the terminals of said at least one communication antenna 3.

This is the case when the movement of said at least one communication antenna 3 is a bringing of said at least one communication antenna 3 closer to the printed circuit board 4, which is easy to achieve during a depression deformation of the component 1 incorporating the activation module 2.

Referring mainly to FIG. 1, the present invention is concerned with an activation module 2 for a function, which activation module is intended to be incorporated into a component 1 that is present in a motor vehicle in order to activate a function of the vehicle from a portable access device with which a user is equipped. This function may be a function for locking or unlocking a door of the motor vehicle or a starting function, which is not limiting.

This activation module 2 implements an activation method as described previously. To do this, the activation module 2 comprises a detection and communication device comprising at least one communication antenna 3 transmitting a magnetic field at a high frequency selected between 3 and 30 MHz for a detection of the portable access device and a communication with the access device, advantageously using near field communication or NFC communication.

The activation module 2 also comprises a device for detecting a deformation of the component 1 following the act of a part of the user's body pressing the component 1, said at least one communication antenna 3 being connected to a printed circuit board 4 by an electrical connection 11.

The printed circuit board 4 comprises means for measuring voltage variation across the terminals of said at least one communication antenna 3, means for interpreting the measuring means and transmission and reception means with an electronic control unit having means for activating the function.

According to the invention, said at least one communication antenna 3 is movable relative to the printed circuit board 4 under the action of a deformation of the component when the user presses it. This can be verified on an activation module 2 taken in isolation from the component, a pressure exerted on said at least one communication antenna 3 causing a movement of said at least one communication antenna 3. The measuring means then detect a voltage variation across the terminals of said at least one communication antenna 3.

Those skilled in the art have sufficient skills to quantify the micro-deformation that the area of the component 1 undergoes under the pressure due to the act of the user pressing it and consequently to select the style and the material of the support for said at least one communication antenna 3 so that said at least one communication antenna 3 moves under this micro-deformation without moving under a lesser pressure.

There are multiple mobility options for the communication antenna or antennas 3, advantageously a single antenna with respect to the printed circuit board 4. The movement of the communication antenna or antennas 3 may be moving closer to or away from the printed circuit board 4 when the user presses the component 1, a moving closer being preferred.

In an embodiment of the invention that is not shown in the figures, the communication antenna or antennas can be carried by a flexible arm that bends toward the printed circuit board when the user presses an area of the outer wall of the component, the communication antenna or antennas bearing against an area of the inner wall of the component corresponding to the area of the outer wall that the user presses while facing this area of the outer wall.

In another preferred embodiment, shown in FIG. 1, the communication antenna or antennas 3 can, on the one hand, bear against an area of the inner wall 7b of the component 1 corresponding to the area of the outer wall 7a that the user presses while facing this area of the outer wall 7a and, on the other hand, supported directly or indirectly by an element bearing against the printed circuit board 4.

In both embodiments, the communication antenna or antennas 3 can be glued against the area of the inner wall 7b of the component 1, this advantageously via a flexible intermediate printed circuit board, which is different from the printed circuit board 4, this flexible intermediate printed circuit board not being visible in FIG. 1. The use of a flexible intermediate printed circuit board makes it possible to protect the communication antenna or antennas 3 and to model them on the inner dimensions of an area of the inner wall 7b of the component 1.

For example, said at least one communication antenna 3 may be movable toward the printed circuit board 4, a ferrite layer 5 being sandwiched between said at least one communication antenna 3 and the printed circuit board 4. The ferrite layer 5 channels the magnetic field coming from the communication antenna or antennas 3 and causes a more pronounced increase in the inductance of the communication antenna or antennas 3, the inductance already also being increased by the bringing of the communication antenna or antennas 3 closer to the printed circuit board 4.

A foam layer 6 may be interposed between the ferrite layer 5 and at least one communication antenna 3. The foam layer 6 is flexible enough not to hamper the movement of at least one communication antenna 3 toward the printed circuit board 4 but strong enough to damp a stray movement of said at least one communication antenna 3 other than during a deformation of the component 1 incorporating the activation module 2, thus supporting said at least one communication antenna 3. At least the communication antenna 3, the foam layer and the ferrite layer 5 can have the same length and advantageously the same width, while the printed circuit board 4 can be noticeably longer and wider than the communication antenna 3, for example two to three times longer or more. In FIG. 1, the arrow FA indicates the direction in which the user presses the component 1, while the arrow Fd indicates the movement of said at least one communication antenna 3 toward the printed circuit board 4 and back as soon as the pressing no longer causes deformation of the component 1, the deformation of the component 1 naturally being reversible.

Thus, at least one communication antenna 3, the ferrite layer 5 and the printed circuit board 4 can extend in superimposed parallel planes, advantageously perpendicular to a thickness of the component 1 incorporating the activation module 2. At least one communication antenna 3, the foam layer 6, the ferrite layer 5 and the printed circuit board 4 are adjacent by successively resting on each other.

The invention is concerned with a component 1 carried by a motor vehicle incorporating such an activation module 2 advantageously surrounded by plastic such as polyurethane into a closed interior space. An outer wall area 7a of the component 1 is capable of being pressed by a part of the user's body, said at least one communication antenna 3 of the module 2 being in contact, advantageously via the flexible intermediate printed circuit board supporting said at least one communication antenna 3, with an inner wall area 7b of the component 1 facing the outer wall area 7a.

This component 1 may be a motor vehicle door handle or door frame. The outer wall area 7a of the component 1 for the user to press in order to perform a locking may be different from the outer wall area 7a for an unlocking.

In FIG. 1, the component 1 is in two parts with one part in the form of a receptacle 1b and one part in the form of a cover 1a, the two parts together incorporating the activation module 2 and being hermetically secured to one another.

The invention claimed is:

1. An activation module configured to be incorporated into a component that is present in a motor vehicle in order to activate a function of the vehicle from a portable access device with which a user is equipped, the activation module comprising:
   a detection and communication device comprising at least one communication antenna transmitting a magnetic field at a high frequency selected between 3 and 30 MHz for a detection of the portable access device and a communication with the portable access device; and
   a printed circuit board connected to the at least one communication antenna by an electrical connection, the at least one communication antenna being movable relative to the printed circuit board under action of a pressure exerted on the at least one communication antenna in accordance with a deformation of the component after a part of a body of the user presses the component, the printed circuit board being configured to
      selectively detect and measure at least one voltage variation across terminals of said at least one communication antenna when one of: (i) the deformation of the component is detected when pressure is exerted on the at least one communication antenna, (ii) the portable access device is detected, and (iii) the combination of the deformation of the component is detected and the portable access device is detected, and
      transmit the detected and measured at least one voltage variation to an electronic controller configured to activate the function based on the detected and measured at least one voltage variation.

2. The activation module as claimed in claim 1, further comprising a ferrite layer sandwiched between said at least one communication antenna and the printed circuit board.

3. The activation module as claimed in claim 2, further comprising a foam layer interposed between the ferrite layer and said at least one communication antenna, and
   wherein another printed circuit board carries the at least one communication antenna and is flexible.

4. The activation module as claimed in claim 3, wherein said at least one communication antenna, the ferrite layer, and the printed circuit board extend in parallel planes, said at least one communication antenna, the foam layer, the ferrite layer, and the printed circuit board being adjacent by successively resting on each other.

5. A system comprising:
   the activation module as claimed in claim 1; and
   a component carried by a motor vehicle, the component having a closed interior space into which the activation module is disposed, the component comprising
      an outer wall area of the component configured to be pressed by the part of the body of the user, and
      an inner wall area of the component facing the outer wall area, the at least one communication antenna being in contact with the inner wall area.

6. The system component as claimed in claim 5, wherein the component is a motor vehicle door handle or door frame.

7. A method for activating a function of a motor vehicle from a portable access device with which a user is equipped communicating with a detection and communication device forming part of an activation module accommodated in a component of the vehicle, the method comprising:
   activating the function of the motor vehicle by detecting:
      (i) an approach of the portable access device toward the vehicle by periodic transmission of signals at a high frequency selected between 3 and 30 MHz that are sent by at least one communication antenna of the detection and communication device, the approach being detected, in response to said signals, by a first variation in a voltage across terminals of said at least one communication antenna and being confirmed by a subsequent establishment of a communication between the detection and communication device and the portable access device, and
      (ii) a deformation of the component after a part of a body of the user presses the component causing the component to move said at least one communication antenna in the component, thereby creating a second voltage variation across the terminals of said at least one communication antenna, the function being activated when the second voltage variation is detected subsequently to detecting the first voltage variation.

8. The method as claimed in claim 7, wherein the first variation is a drop in the voltage across the terminals of said at least one communication antenna and the second variation is an increase in the voltage across the terminals of said at least one communication antenna.

9. The method as claimed in claim 7, wherein the communicating taking place at a frequency of 13.56 MHz.

10. The method as claimed in claim 7, wherein the communication takes place in the near field.

11. A system comprising:
    the activation module as claimed in claim 2; and
    a component carried by a motor vehicle, the component having a closed interior space into which the activation module is disposed, the component comprising
       an outer wall area of the component configured to be pressed by the part of the body of the user, and
       an inner wall area of the component facing the outer wall area, the at least one communication antenna being in contact with the inner wall area.

12. A system comprising:
    the activation module as claimed in claim 3; and
    a component carried by a motor vehicle, the component having a closed interior space into which the activation module is disposed, the component comprising
       an outer wall area of the component configured to be pressed by the part of the body of the user, and
       an inner wall area of the component facing the outer wall area, the at least one communication antenna being in contact with the inner wall area.

13. A system comprising:
    the activation module as claimed in claim 4; and
    a component carried by a motor vehicle, the component having a closed interior space into which the activation module is disposed, the component comprising
       an outer wall area of the component configured to be pressed by the part of the body of the user, and
       an inner wall area of the component facing the outer wall area, the at least one communication antenna being in contact with the inner wall area.

14. The method as claimed in claim 8, wherein the communicating taking place at a frequency of 13.56 MHz.

15. The method as claimed in claim 8, wherein the communicating taking place in the near field.

16. The method as claimed in claim 9, wherein the communicating taking place in the near field.

17. The system as claimed in claim 11, wherein the component is a motor vehicle door handle or door frame.

18. The activation module as claimed in claim 1, wherein the printed circuit board is configured to detect and measure the at least one voltage variation across the terminals of said at least one communication antenna when both: (i) the deformation of the component is detected when pressure is exerted on the at least one communication antenna, and (ii) the portable access device is detected.

* * * * *